United States Patent Office 2,820,363
Patented Jan. 21, 1958

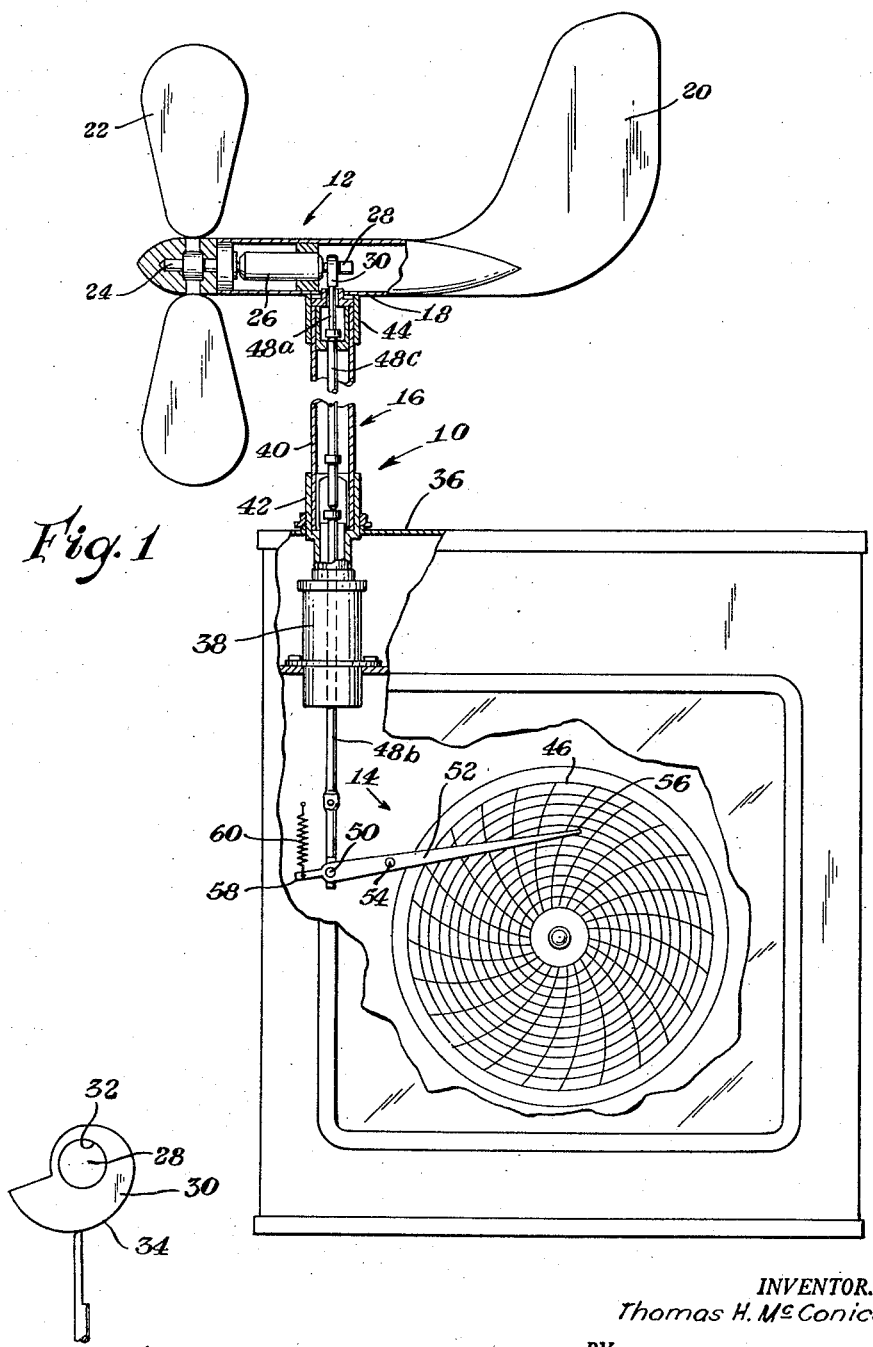

2,820,363

WIND FLOW RECORDER

Thomas H. McConica III, Clare, Mich.

Application May 9, 1956, Serial No. 583,864

5 Claims. (Cl. 73—189)

This invention relates to apparatus for measuring and recording weather data and particularly to wind flow measuring and recording apparatus.

The measurement of wind velocity and total wind flow at various locations on the earth's surface provides important data which is used in predicting weather conditions.

While many fine instruments have been previously developed which will record wind velocity, total wind flow per unit time, or both, most of these instruments are not well suited for use at weather data stations where no electrical power or skilled technicians are available. Further, many wind measuring instruments are too bulky or too complex to be readily dismantled and moved from one location to another. In military usage or for experimental usage, portability of instruments is an important design criterion.

Accordingly, a principal object of this invention is to provide improved, easily portable apparatus for measuring and recording wind velocity and total wind flow over a considerable period of time.

Another object of this invention is to provide improved, easily portable, mechanically actuated apparatus for measuring and recording wind velocity and wind flow.

In accordance with this invention there is provided wind flow and velocity measuring apparatus which includes a rotatable propeller which is mounted in a rotatable wind head which is supported by a hollow shaft attached to a case which houses a pen type, mechanically driven recording unit. The rotatable propeller is coupled to the input shaft of a gear reduction unit having a cam coupled to its output shaft. A rod contained inside the shaft supporting the wind head is spring loaded or counter weighted to keep the upper rod end pushed against the cam at all times. An arm coupled to the lower rod end drives a pen recorder. As the propeller rotates in response to wind flow, the cam rotates slowly, causing the rod to move and deflect the pen of the recorder. Thus, one revolution of the cam measures a specific amount of wind flow, and the average velocity for any unit of time may be determined by referring on the chart to the time required to cause a certain deflection of the pen.

The invention, as well as additional objects and advantages thereof, will best be understood when the following detailed description is read in connection with the accompanying drawings, in which:

Fig. 1 is a side elevational view, partly in section, of wind data recording apparatus in accordance with this invention, and Fig. 2 is a fragmentary end elevational view showing the cam and rod end of the apparatus of Fig. 1.

Referring to the drawings, there is shown wind flow measuring and recording apparatus, indicated generally by the numeral 10, which includes three general parts, a wind head 12, recorder 14, and a wind head supporting and coupling assembly 16.

The wind head 12 includes a fuselage-like housing 18 having a vane 20 at the rear or tail end and a propeller 22 at the forward or nose end. The propeller is coupled to the input shaft 24 of a gear reduction unit 26 which has an output shaft 28. The gear reduction ratio between the input shaft 24 and the output shaft 28 is usually several thousand-to-one. A cam 30 having a bore 32 is coupled to the output shaft 28. The cam 30, as best seen in Fig. 2, is preferably shaped so that the radial distance from the central shaft 28 to the periphery 34 increases linearly as with rotation through 360°, then drops sharply towards the center shaft 28.

The wind head 12 is supported above the housing or case 36 by a hollow tube or shaft 40 which fits into a receptacle 42 on the case 36 and into a receptacle 44 on the housing 18 of the wind head 12. The receptacles 42, 44 fit closely around the shaft 40. The receptacle 42 extends through the wall of the housing 36 and is supported in a freely rotatable manner by the bearing assembly 38.

The recorder apparatus is composed of a mechanically rotated disc 46 which is driven by a clock-work motor (not shown). Alternatively, a moving strip or non-rotating type recording roll may be used instead of the circular recording discs 46.

A multiple part rod 48 is disposed inside the shaft 40. The upper end section of the rod 48a (see also Fig. 2) bears against the peripheral 34 of the cam 30 and is retained within the wind head when the shaft 40 is disassembled. The lower end section 48b of the rod is coupled by means of the pivotal connection 50, to the pen driving arm 52 of the recorder 14. The rod section 48b is retained within the housing 36 (in receptacle 42) when the shaft 40 is removed from the receptacle. The pen driving arm 52 is pivoted, as at 54, to provide a swing of the pen 56 between the center and periphery of the rotatable recording disc 46 as the cam 26 rotates. The outer end 58 of the pen driving arm 52 is connected with a spring 60 which tend to keep the rod 48 pushed upwardly against the cam 30. The central rod section 48c is retained within the shaft 40 when the apparatus 10 is dismantled.

In operation, wind flowing past the vane 20 keeps the propeller 22 headed into the wind. The pitch of the blades of the propeller 22 may be conveniently chosen to provide linear rotational response with respect to the velocity of the wind. Alternatively, a helicoidal propeller may be used.

In one wind flow measuring device in accordance with this invention, the propeller 22 is designed to rotate at the rate of 400 R. P. M. in a 20 M. P. H. wind. The gear reduction unit has a reduction ratio of 24,000 to 1, thus rotating the cam one time per hour when a 20 M. P. H. wind is turning the propeller 22. For practical purposes, the propeller 22 is running unloaded when coupled to the gear reduction unit. Thus, in the device being now described, one arc on the disc 46 resulting from a single revolution of the cam 30 indicates a 20 mile wind flow. The displacement of the pen line towards the periphery of the disc in a unit of time is a measure of wind velocity.

Obviously, other propellers and gear reduction units having different ratios may be used in devices in accordance with the invention. In the specific example described a "Metron" type gear reduction unit is used, although other gear reduction units of suitable design which do not "load" the propeller 22 may be used.

While circular recording discs 46 have been described in connection with this invention, moving strip type recording sheets may also be used. The disc 46 is conveniently driven by a clockwork motor.

Likewise, while technically more difficult to accomplish, the cam 30 may be driven by a clockwork motor or other suitably controlled motor and the output of the gear reduction unit 26 utilized to rotate the disc 46.

What is claimed is:

1. Wind flow measuring apparatus comprising a fuselage section containing a vane axially aligned therewith, a rotatable propeller, a gear reduction unit having an input shaft and an output shaft, and a cam, said gear reduction unit being disposed in said fuselage section, said propeller being coupled to said input shaft and said cam being coupled to said output shaft, said cam having a peripheral surface, wiper means engaging said peripheral surface and adapted to move axially, and means for recording as a function of time axial movement of said wiper means as said cam rotates.

2. Apparatus in accordance with claim 1, wherein said means for recording includes a calibrated chart adapted to be advanced by a motor coupled thereto, and said wiper means is coupled to a pen which engages said chart.

3. Apparatus in accordance with claim 1, wherein said fuselage is adapted to be rotated freely in a horizontal plane.

4. Wind flow measuring apparatus comprising a gear reduction unit having an input shaft and an output shaft, a propeller, said propeller being coupled to said input shaft, a cam, said cam being coupled to said output shaft, a chart type recorder unit having a moveable pen, and mechanical means for coupling said pen to said cam, said mechanical means including a rod-like structure coupled to said pen and adapted to bear against said cam.

5. Apparatus in accordance with claim 4, wherein means are provided for maintaining said propeller in alignment with the direction of wind flow.

References Cited in the file of this patent

UNITED STATES PATENTS

| | | |
|---|---|---|
| 2,579,344 | Sias | Dec. 18, 1951 |
| 2,608,859 | Sontag et al. | Sept. 2, 1952 |
| 2,648,980 | Wood et al. | Aug. 18, 1953 |